G. C. SNYDER.
PUCKER REMOVING MECHANISM.
APPLICATION FILED SEPT. 11, 1914. RENEWED JUNE 29, 1916.

1,217,521.

Patented Feb. 27, 1917.
6 SHEETS—SHEET 2.

G. C. SNYDER.
PUCKER REMOVING MECHANISM.
APPLICATION FILED SEPT. 11, 1914. RENEWED JUNE 29, 1916.
1,217,521.
Patented Feb. 27, 1917.
6 SHEETS—SHEET 3.
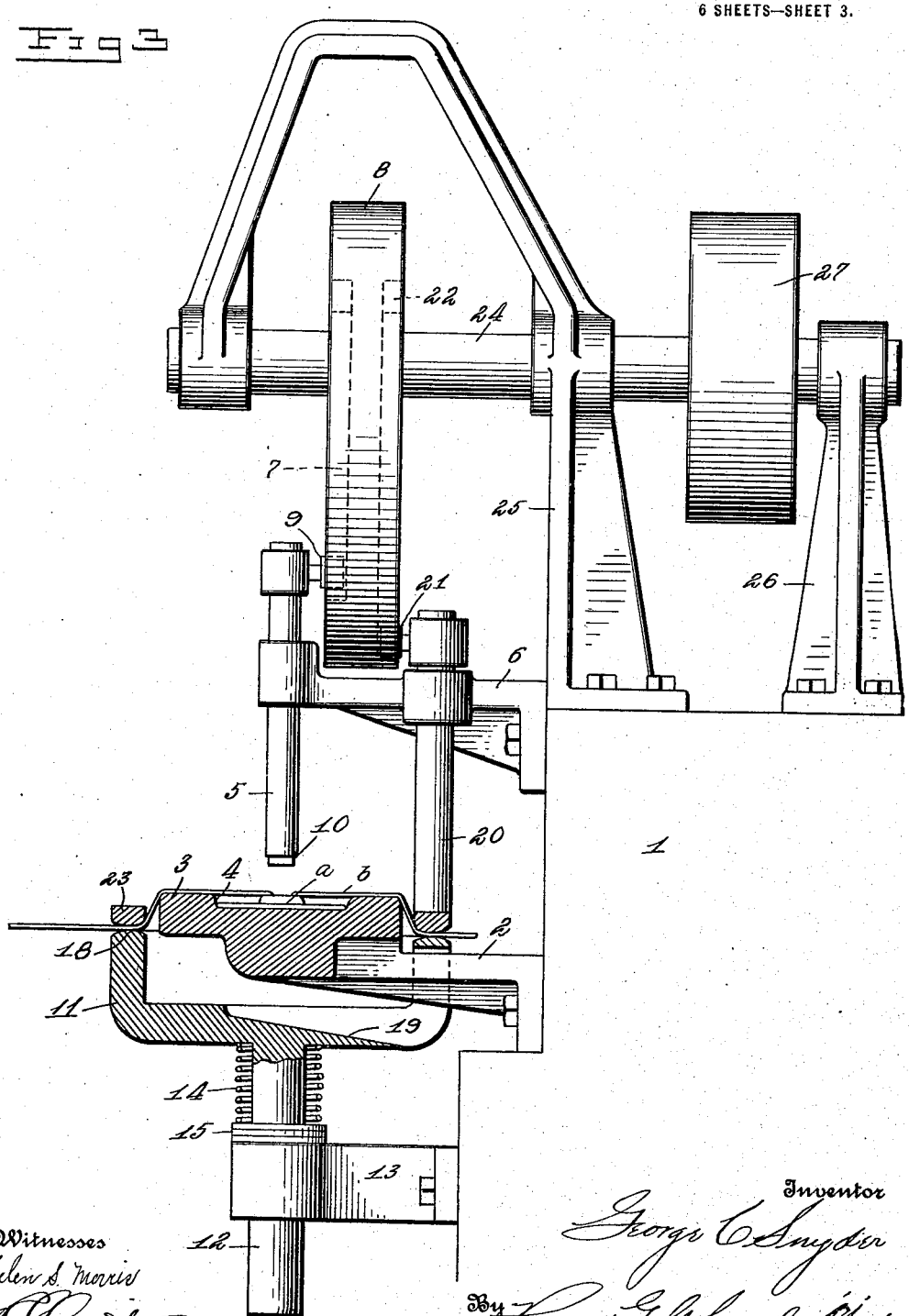

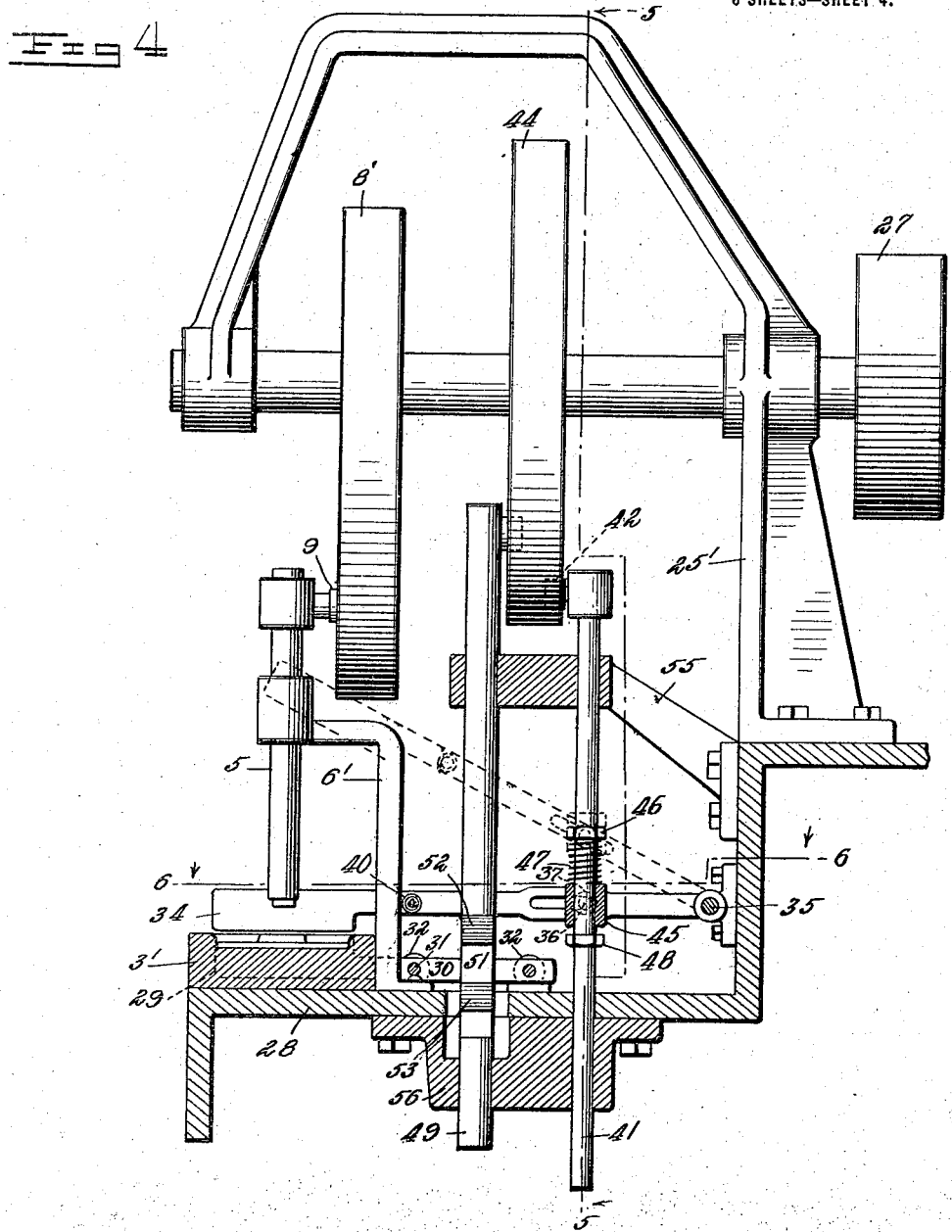

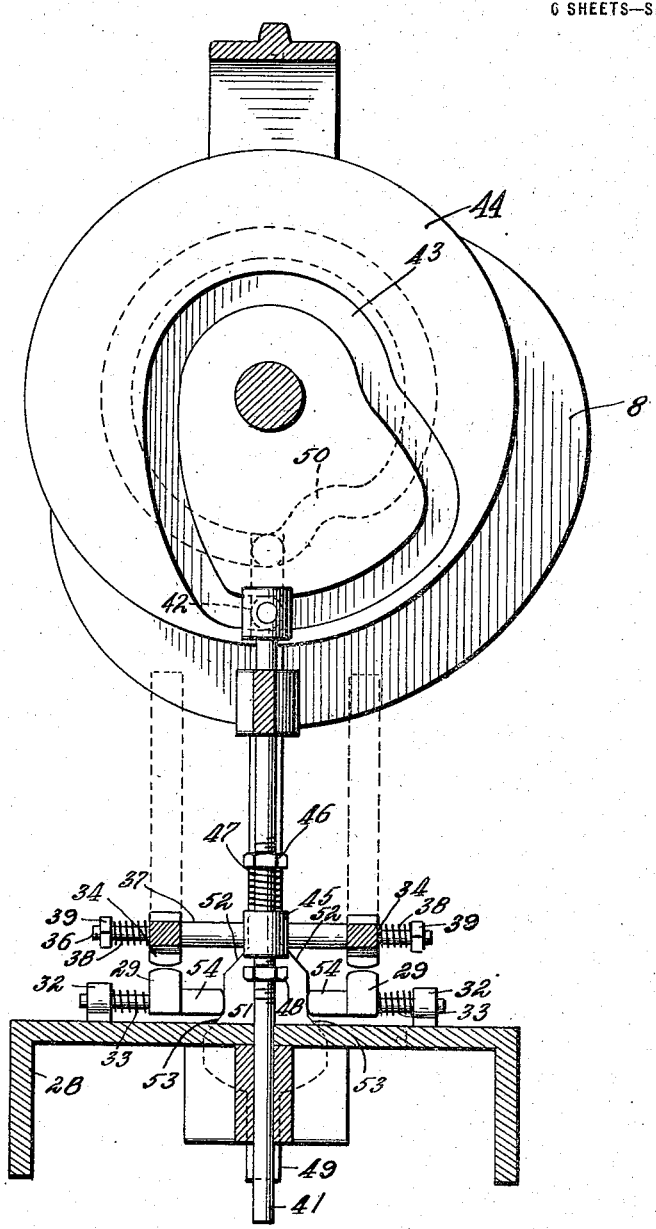

G. C. SNYDER.
PUCKER REMOVING MECHANISM.
APPLICATION FILED SEPT. 11, 1914. RENEWED JUNE 29, 1916.
1,217,521.
Patented Feb. 27, 1917.
6 SHEETS—SHEET 6.
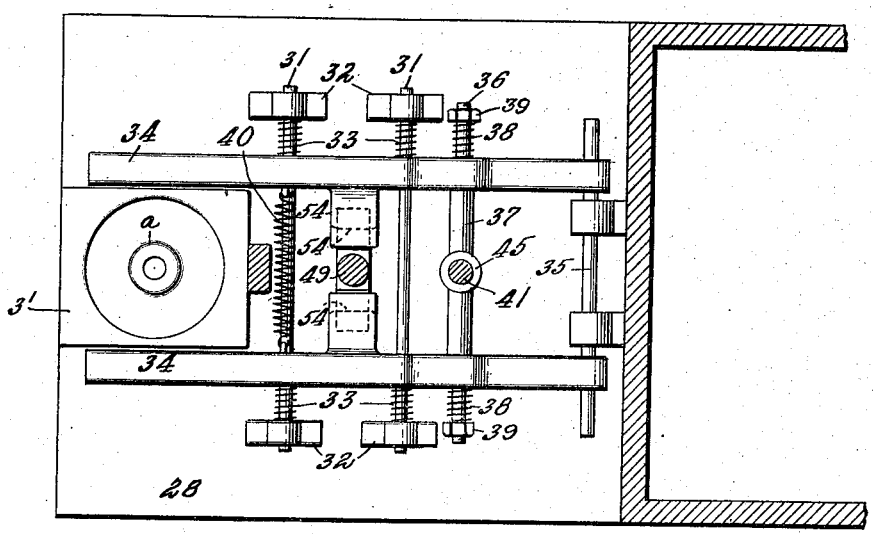
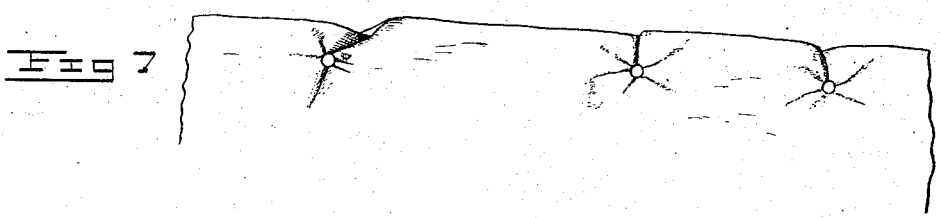
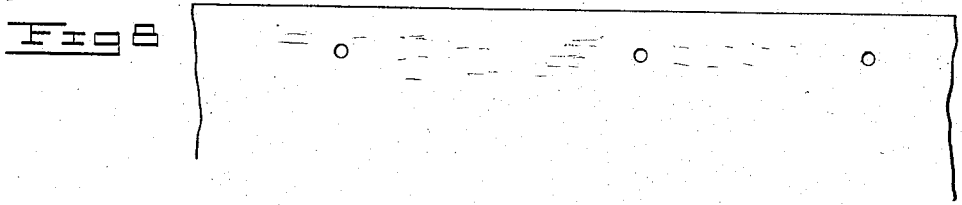
Witnesses
Helen A. Morris
Inventor
George C. Snyder
By
Attorneys

UNITED STATES PATENT OFFICE.

GEORGE C. SNYDER, OF NEW YORK, N. Y.

PUCKER-REMOVING MECHANISM.

1,217,521.  Specification of Letters Patent.  Patented Feb. 27, 1917.

Application filed September 11, 1914, Serial No. 861,263. Renewed June 29, 1916. Serial No. 106,733.

*To all whom it may concern:*

Be it known that I, GEORGE C. SNYDER, a citizen of the United States, residing in the city of New York, county of New York, and State of New York, have invented certain new and useful Improvements in Pucker-Removing Mechanisms; and I do hereby declare the following to be a full, clear, and exact description of the invention, such as will enable others skilled in the art to which it appertains to make and use the same.

The present invention aims to provide a machine for removing the pucker or crinkle from fabrics after threadless buttons have been applied thereto.

It has been found desirable in "setting" buttons, and other fasteners of the threadless type, to carry a portion of the fabric as far as possible into one of the parts of the fastener and to clamp it therein by another part, thus insuring a tight grip by the fastener on the fabric. This constitutes one of the important features of the fastening devices disclosed in a number of my co-pending applications, of which Serial No. 844,434, filed June 11, 1914, may be taken as an example. It has been found, however, that when the fabric is so carried into one of the parts of the fastener, the material to which the fastener is applied puckers or crinkles at the base of the fastener. It is the object of the present invention to provide a machine for removing this pucker to leave the material at the base of the fastener in a smooth and neat condition.

Broadly, the invention consists in providing means for exerting tension on the fabric after the fastening device has been set to smooth out the fabric by pulling out all of the crinkles. In the present instance, the mechanism for removing the pucker is combined with mechanism for setting the fastener, so that the two operate in timed relation. The pucker-removing mechanism may, however, constitute a machine separate and independent from the setting mechanism without departing from the spirit or scope of the invention, as hereinafter defined in the claims.

The invention is illustrated in the accompanying drawings, in which:—

Fig. 3 is a side elevation, partly in section, of the construction shown in Fig. 2;

Fig. 4 is a side elevation, partly in section, of a modified form of pucker-removing mechanism;

Fig. 5 is a vertical section taken on the line 5—5 of Fig. 4;

Fig. 6 is a horizontal section taken on the line 6—6 of Fig. 5;

Fig. 7 is an underneath view of a portion of fabric having threadless buttons applied thereto, and illustrating the manner in which the material puckers or crinkles around the base of the buttons; and Fig. 8 illustrates the appearance of the fabric after the pucker has been removed.

Figure 1:
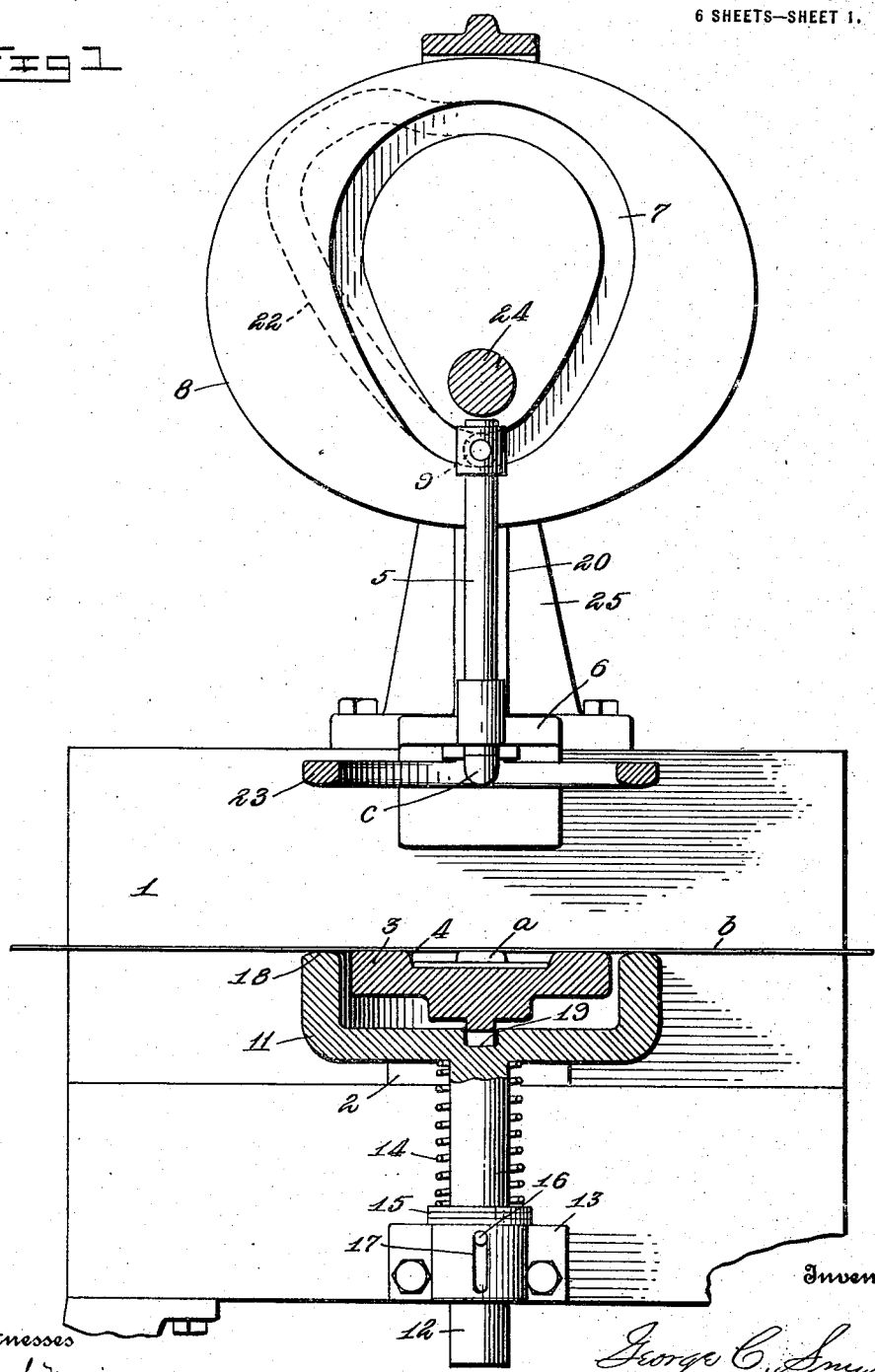
Figure 1 is a front elevation, partly in section, of a combined machine for setting a button of the type disclosed in the copending application above referred to and for removing the pucker from the material after the button has been set.
Figure 2:
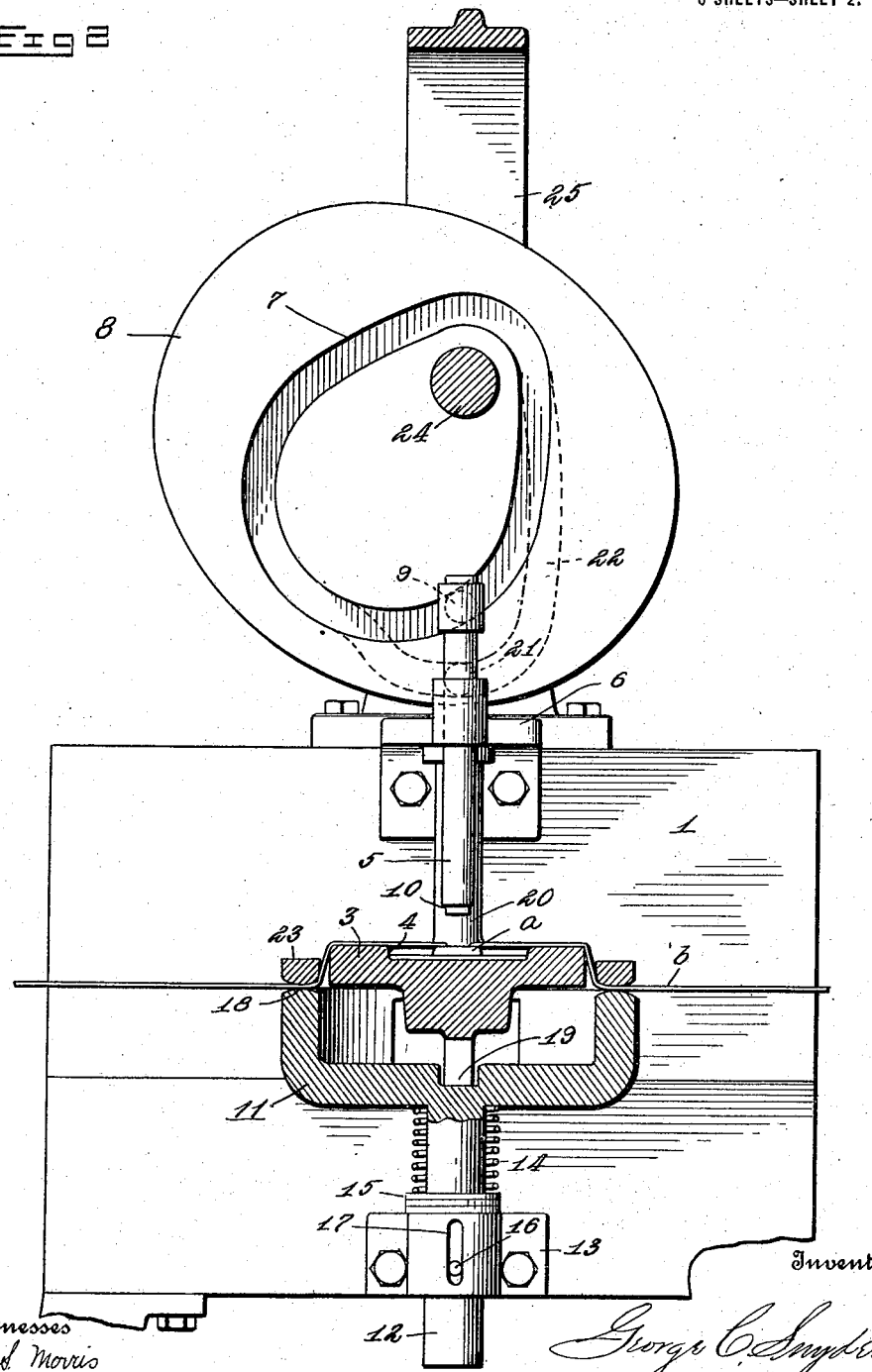
Fig. 2 is a similar view showing the parts in the position which they assume just after the button has been set, and after the pucker-removing mechanism has operated.

Referring to the drawings, and particularly to Figs. 1 to 3, inclusive, the machine comprises a suitable supporting structure 1, upon which is mounted a bracket 2 serving as a work support for the material to be operated upon. The work-supporting portion of the bracket shown at 3 is provided with a depression or recess 4 adapted to receive the button or other fastener $a$ to be applied to the fabric. The present machine is designed for setting buttons of the type disclosed in the pending application above mentioned, and the recess 4 is, therefore, in the present instance, designed to receive an inverted main body portion of the button, as clearly shown in the drawings. The fabric to which the button is to be applied is represented at $b$, and is shown in Fig. 1 as stretched across the opening in the shank of the inverted button $a$. A plunger 5, suitably mounted and guided, such as by the bracket 6, is actuated by a cam groove 7 formed in a rotary cam 8. The plunger 5 carries a roller 9, which engages in the cam groove 7, the latter being of such shape that the plunger 5 is reciprocated during the rotation of the cam 8. The inner tubular thimble which serves to clamp a portion of the fabric $b$ in the shank $a$ of the button, is placed upon the lower extremity of the plunger 5, as shown at $c$ in Fig. 1, a suitable shoulder 10, (Figs. 2 and 3), being provided to engage the peripheral edge of the thimble. As the plunger 5 descends, the thimble c is forced into the shank 8 of the button, carrying with it a portion of the fabric b. The thimble contacting with the head of the button collapses and expands radially in the shank of the button to lock the thimble in the shank and to clamp the fabric between the walls of the shank and the expanded thimble, as explained in the pending application above mentioned.

The pucker-removing mechanism consists of an annular cup-shaped member 11 carried by a vertical post 12, which is slidably mounted in a suitable bracket 13. A spring 14 is interposed between the bottom of the cup-shaped member 11 and the bracket 13 to yieldingly resist downward movement of said cup-shaped member. In order to vary the tension of the spring 14, several washers 15 are preferably interposed between the lower extremity of the spring and the bracket 13, the number of which washers may be so chosen as to give the spring 14 its proper strength. When it is desired to increase the tension of the spring, for the purpose hereinafter stated, a greater number of washers may be supplied or washers having a greater thickness may be used. On the other hand, if it is desired to decrease the strength of the spring, one or more washers may be removed, or washers of less thickness substituted. This means for adjusting the tension of the spring is only exemplary, as obviously any suitable means may be used for the purpose.

The upward movement of the cup-shaped member 11 is limited by a pin 16 carried by the post 12, which engages in a suitable slot 17 formed in the bracket 13. When the cup-shaped member 11 is in its extreme upward position, the peripheral upper edge 18 of said member should be substantially flush with the face of the work support 3. In order that the cup-shaped member 11 may present an unbroken peripheral edge, which completely encircles the work support 3, an opening 19 is provided in the cup-shaped member through which the shank of the bracket 2 may pass, the opening being large enough to permit relative movements between the cup-shaped member and the bracket 2, as clearly shown in Fig. 3.

A plunger 20, which may also be guided in the bracket 6, carries a roller 21, which engages in a cam groove 22 formed in the inner face of the cam 8. The lower extremity of the plunger 20 carries an annular member 23 adapted to coöperate with the peripheral edge 18 of the cup-shaped member 11 in gripping the fabric, as will hereinafter appear.

The cam 8 may be rotated in any suitable manner, but, as herein shown, is mounted upon an actuating shaft 24 rotatably carried by the brackets 25 and 26. A pulley 27 is mounted upon the actuating shaft 24 and may be rotated from any suitable source of power. Any appropriate means may be used for actuating the parts, however, as that shown is merely exemplary.

The cam grooves 7 and 22 are so formed that the plunger 5 first descends, sets the button as above described, then begins to rise. Just as the plunger 5 begins to rise, the cam groove 22 forces the plunger 20 down until the lower peripheral edge of the annular member 23 contacts with the fabric b and forces the same against the annular peripheral edge 18. The fabric is then gripped between the two annular members and a further downward movement of the plunger 20 causes the cup-shaped member 11 to move downwardly against the action of spring 14 until the parts assume the position shown in Figs. 2 and 3. The downward movement of the members 23 and 11 causes the fabric b to be stretched and pulled over the work support 3, as shown in Figs. 2 and 3, thereby exerting tension on the fabric which removes the pucker from the material and leaves the same in a smooth condition. The tension of the spring 14 is so adjusted as to cause the fabric b to slip between the members 23 and 11 in case undue strain is placed upon the fabric. The strength of the spring 14 must always be sufficient, however, to allow the members 23 and 11 to grip the fabric tight enough to pull out the crinkles in the fabric. The tension of the spring 14 may be adjusted in the manner hereinbefore described to meet different conditions brought about by different thicknesses of fabric, or different strengths of the same. After the fabric is stretched to the position shown in Figs. 2 and 3, the plunger 20 is caused to ascend by the cam groove 22 and the cycle of operations above described is repeated.

It will be noted that the mechanism described above exerts a radial pull on the fabric, but a radial pull may not, in all instances, be necessary, and, therefore, a modified form of pucker removing mechanism is disclosed in Figs. 4 to 6, inclusive, for exerting a longitudinal pull on the fabric. The setting mechanism, in this form of the invention, is substantially the same as that hereinbefore described, except that the work support 3', corresponding to the work support 3 in Figs. 1 to 3, is supported on a flat table 28 instead of by a bracket, as in Figs. 1 to 3. Mounted upon the table 28, at either side of the work support 3', is a jaw 29, said jaws being mounted for simultaneous movements toward and away from the work support 3'. This is accomplished by providing extensions 30 on the jaws 29, which extensions are slidably mounted on two transverse guide rods 31. The guide rods 31 may be mounted in any suitable manner upon the table 28, such as by means of the brackets 32, one of which is located at each end of the guide rod. Springs 33, interposed between the brackets 32 and the jaws 29, tend to hold the same in their extreme inward position. From this construction, it will be noted that the jaws 29 move in the plane of the work support 3', and remain in parallel relation, due to the provision of the transverse guide rods 31. An upper set of jaws coöperate with the lower set to grip the fabric at either side of the work support. The two upper jaws are shown at 34, and are spaced apart at distance equal to the distance between the lower jaws 29. The upper jaws 34 are capable of a pivotal movement around the rod 35 as an axis to permit the insertion of the fabric in the machine and are also mounted, so as to be capable of bodily sliding movements corresponding to the sliding movements of the lower jaws 29. This is accomplished by not only pivotally mounting the jaws 34 on the rod 35, but also slidingly mounting the inner ends of the jaws on said rod. The intermediate portions of the jaws slide upon a guide rod 36 carrying a sleeve 37 interposed between the jaws to properly space the same, and to limit their inward movement. The upper jaws 34' are yieldingly held in their inward position by means of springs 38 interposed between the jaws 34 and nuts 39, carried by the extremities of the transverse rod 36. A spring 40, connecting the jaws near their outer ends, may be provided for assisting in holding the jaws in their inward position.

The two upper jaws 34 are simultaneously raised to the dotted line position shown in Fig. 4, to permit the fabric to be inserted in the machine by means of a rod 41, which carries a cam roller 42 engaging in a cam groove 43 provided in one face of a rotary cam 44. This rod 41 passes through a vertical portion 45 of the sleeve 37, as shown in Fig. 6, and operates upon said sleeve to simultaneously raise and lower the upper jaws. Preferably, a yielding connection is provided between the rod 41 and the upper jaws, which, in the present instance, comprises a nut or shoulder 46 carried by the rod 41, and a spring 47, interposed between said nut and the vertical portion 45 of the sleeve 37. As the rod 41 descends, the jaws 34 are, therefore, yieldingly forced in a downward position. A suitable nut or shoulder 48, positioned on the rod 41, serves to positively raise the jaws during the upward movement of the rod 41.

After the button is applied, in the manner hereinbefore described, the rod 41 is caused to descend by the cam groove 43, and the upper pair of jaws are, therefore, moved downwardly around the rod 35 as an axis to grip the fabric at either side of the work support between the upper jaws and the lower jaws. The cam groove 43 is so shaped that the fabric will continue to be thus gripped until the mechanism hereinafter described exerts a spreading action on the two sets of jaws to move the upper and lower jaws, at one side of the work support, laterally and bodily away from the upper and lower jaws at the other side of the work support, thereby producing a longitudinal pull on that portion of the fabric which lies over the work support.

The mechanism for accomplishing this comprises a plunger 49, which is reciprocated by means of a cam groove 50, formed in the other face of the cam 44. The plunger 49 is provided with a cam shown at 51, having a wedge like portion 52 to spread the upper jaws apart, and having a wedge-like portion 53 to spread the lower jaws apart. Both of the jaws of the upper and lower set are provided with lateral extensions 54, upon which the cam faces or wedge-like portions of the cam operate. It is obvious that as the plunger 49 and the cam 51 move upwardly, the cam faces 52 will act upon the two jaws of the upper set to move the same laterally and the cam faces 53 will act upon the two jaws of the lower set to move them laterally simultaneously with the lateral movement of the upper jaws. The cam 51 is so shaped that the movement of all the jaws will be equal.

While the fabric is being gripped by the jaws, in the manner above described, the rod 49 is slightly raised and then lowered by the cam groove 50 to move the jaws laterally, as above described, the springs 33, 38 and 40 serving to return the jaws to their normal position when released, and to yieldingly oppose the lateral separation of the jaws. After the jaws have thus been operated to exert the necessary tension on the fabric, the upper jaws are moved to the dotted line position shown in Fig. 4, by the rod 41 and cam groove 43.

In the modified form of the machine shown in Figs. 4 to 6, the rod 41 and plunger 49 may be mounted and guided in any suitable manner, such as by means of a bracket 55, serving to guide the upper parts thereof, while a guide block 56 may be secured to the under side of the table 28 to guide the lower parts of the rod 41 and plunger 49.

The cam 44 may be mounted on the same shaft as the cam 8', which, in the modified form of Figs. 4 to 6, is provided with only one cam groove.

A portion of the fabric, after having the buttons applied thereto, is shown in Fig. 7, which illustrates how the material puckers at the entrance to the shank of the button. Fig. 8 represents the same portion of fabric after being subjected to the operation of the pucker removing mechanism, which, as will be noted, has removed all of the puckers and crinkles, thereby leaving the fabric in a smooth and neat condition.

Obviously many changes may be made in the details of construction, as above described, without departing from the spirit or scope of the invention, as defined in the claims.

What I claim is:—

1. A machine for removing the pucker from fabric at the base of threadless fastening devices, comprising means to grip the fabric in the vicinity of the fastening device, and means to move the gripping means relative to the fastening device to exert tension on the fabric.

2. A machine for removing the pucker from fabric at the base of threadless fastening devices, comprising means to engage the set fastening device, means to grip opposite sides of the fabric in the vicinity of the fastening device, and means to produce relative movement between the gripping means and the first-named means while the latter is in engagement with the set fastening device.

3. A machine for removing the pucker from fabric at the base of threadless fastening devices, comprising means to engage a set fastening device, means to engage the fabric in the vicinity of the fastening device, and means operable after the set fastening device is engaged by said first-named means to produce relative movement between both of said means to exert tension on the fabric.

4. The combination with a button-setting mechanism, of means operative subsequent thereto for removing the pucker from the material to which the button is applied.

5. In a machine of the kind described, means for setting a fastening device, and means operative subsequent to said first-named means for removing the pucker from the material to which the fastening device is applied.

6. In a machine of the kind described, means for setting a fastening device, and means operative subsequent to said first-named means for exerting tension on the fabric to which the fastening device is applied.

7. Mechanism for removing the pucker from fabric at the base of threadless fastening devices, comprising means for supporting and holding the fastening device, and means for gripping the fabric in the vicinity of the fastening device, said means being relatively movable with respect to the supporting means for the fastening device, to exert tension on the fabric, for the purpose described.

8. The combination with mechanism for setting a fastening device, of means operative subsequent to the operation of the setting mechanism for gripping the fabric to which the fastening device is applied, and then exerting tension on the fabric for the purpose described.

In testimony whereof I affix my signature, in presence of two witnesses.

GEORGE C. SNYDER.

Witnesses:
ARTHUR L. BRYANT,
VERNON T. HOUGHTON.